US010442363B2

(12) United States Patent
Ferman (10) Patent No.: US 10,442,363 B2
(45) Date of Patent: Oct. 15, 2019

(54) LOAD CARRYING BAR

(71) Applicant: Thule Sweden AB, Hillerstorp (SE)

(72) Inventor: Magnus Ferman, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 745 days.

(21) Appl. No.: 14/890,575

(22) PCT Filed: May 13, 2014

(86) PCT No.: PCT/EP2014/059721
§ 371 (c)(1),
(2) Date: Nov. 11, 2015

(87) PCT Pub. No.: WO2014/184172
PCT Pub. Date: Nov. 20, 2014

(65) Prior Publication Data
US 2016/0082892 A1  Mar. 24, 2016

(30) Foreign Application Priority Data

May 13, 2013  (EP) .................................. 13167521

(51) Int. Cl.
*B60R 9/052* (2006.01)
*B60R 9/05* (2006.01)

(52) U.S. Cl.
CPC ............... *B60R 9/052* (2013.01); *B60R 9/05* (2013.01)

(58) Field of Classification Search
CPC ........... B60R 9/052; B60R 9/05; B60R 9/058; B60R 9/04
USPC ....... 224/322, 325, 309, 316, 317, 318, 321, 224/326; 296/180.1
See application file for complete search history.

(56) References Cited

U.S. PATENT DOCUMENTS 3,213,584 A * 10/1965 Bush ......................... E04B 1/68
   277/641
3,606,432 A * 9/1971 Honatzism .............. B60R 13/04
   293/128
4,015,760 A * 4/1977 Bott ......................... B60R 9/04
   293/128

(Continued)

FOREIGN PATENT DOCUMENTS

DE    32 09 912    10/1983
DE    41 13 230    10/1992

(Continued)

OTHER PUBLICATIONS

International Search Report and Written Opinion of the International Searching Authority for International Appl. No. PCT/EP2014/059721, European Patent Office, Rijswijk, Netherlands, dated Dec. 8, 2014, 10 pages.

(Continued)

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A load carrying bar including a channel with an opening. The channel is adapted to receive a fastening member for fasten a load carrying bar accessory to the load carrying bar. A cover is arranged to seal the opening of the channel. The cover is adapted to be deformed in the proximity of the opening as the fastening member is slid along the length of the channel.

29 Claims, 8 Drawing Sheets

(56) References Cited

U.S. PATENT DOCUMENTS

| | | | | |
|---|---|---|---|---|
| 4,432,478 A * | 2/1984 | Bott | ............... | B60R 9/04 |
| | | | | 224/321 |
| 4,911,349 A * | 3/1990 | Miller | ............... | B60R 9/04 |
| | | | | 224/309 |
| 5,207,365 A * | 5/1993 | Bott | ............... | B60R 9/00 |
| | | | | 224/316 |
| 5,282,560 A * | 2/1994 | Ozog | ............... | B62D 35/007 |
| | | | | 224/309 |
| 5,294,033 A * | 3/1994 | Duemmler | ............... | B60R 9/052 |
| | | | | 224/316 |
| 5,471,714 A * | 12/1995 | Olson | ............... | A44B 11/10 |
| | | | | 24/171 |
| 5,474,218 A * | 12/1995 | Arsenault, Jr. | ............... | B60R 9/05 |
| | | | | 224/309 |
| 6,176,404 B1 * | 1/2001 | Fourel | ............... | B60R 9/052 |
| | | | | 224/309 |
| 8,544,707 B2 * | 10/2013 | Hubbard | ............... | B60R 9/04 |
| | | | | 224/309 |
| 8,925,775 B2 * | 1/2015 | Sautter | ............... | B60R 9/058 |
| | | | | 224/322 |

FOREIGN PATENT DOCUMENTS

| | | |
|---|---|---|
| WO | WO 2009/038479 | 3/2009 |
| WO | WO 2009/038481 | 3/2009 |

OTHER PUBLICATIONS

European Search Report for European Application No. EP 13167521.7, European Patent Office, Berlin, Germany, dated Sep. 27, 2013, 6 pages.

\* cited by examiner

LOAD CARRYING BAR

TECHNICAL FIELD

The present invention relates to a load carrying bar comprising a channel with an opening, the channel is adapted for mounting a load carrying bar accessory to the load carrying bar, such as roof box. A cover is arranged in the channel to cover, or seal, the opening of the channel to reduce air turbulence around the channel and the intrusion of dirt in the channel.

BACKGROUND OF THE INVENTION

Roof racks comprising load carrying bars mounted to the roof of an automobile via load carrier feet are commonly used to provide for an improved load capacity on automobiles. During recent years, a trend has been that the cross section of the load carrying bars has been improved to reduce wind resistance and noise. One type of improved load carrying bars have a wing like cross section having a low wind resistance and low noise level.

To attach load carrying bar accessories, such as roof box, to a load carrying bar having a wing like cross section, the load carrying bar is generally equipped with a channel. The channel extends along the length of the load carrying bar and permits a fastening member to be slid along the channel and into position. The fastening member can be a screw for example. Such channels are however associated with numerous problems such as wind turbulence increasing the wind noise and wind resistance. They can also collect dirt or rubble, which in turn accidentally could damage the lacquer of the automobile.

To solve these problems, load carrying bars have been provided with covers also known as cover infills or sealing strips. One load carrying bar comprising a cover to reduce air turbulence around a channel in the load carrying bar is known from the U.S. Pat. No. 6,176,404 B1 in which a sealing strip is disclosed. The sealing strip is provided with cuts in its longitudinal direction enabling a user to remove a central part of the sealing strip in or to allow fastening means to be fixed in the channel. The solution is however not very sophisticated as it requires the user to measure and to remove parts of the sealing strip in order to allow the fastening means to fit in the channel. Another cover infill is disclosed in the International application No. WO 2009/038479 A1. The cover infill disclosed in this document is adapted to be deformed in a strict vertical direction to permit access to the channel of the load carrying bar. There is a risk that the cover infill may be pinched between the fastening means and the floor of the channel. This can damage the cover infill when the fastening means is displaced along the length of the load carrying bar in the channel as the fastening means may rest on the cover infill instead of resting on the load carrying bar itself before being readily attached to the load carrying bar.

It would have been advantageous to provide a cover which requires no or very little manipulation from the user in order to fit the fastening means and which properly seal or cover the channel of the load carrying bar.

SUMMARY

It is an object of the present invention to provide for a solution, or to at least reduce some of the drawbacks of the known prior art, or to provide for a useful alternative. The objects are at least partly met by a load carrying bar for a roof rack, the load carrying bar having a length, a height and a width. The load carrying bar comprises a channel with an opening for receiving a fastening member of a load carrying bar accessory. A cover is arranged to seal at least a portion of the opening of the channel of the load carrying bar, e.g. to reduce air turbulence around the channel. The cover comprises an attachment portion for attaching the cover to the load carrying bar and channel sealing portion adapted to substantially seal at least a portion of the opening of the channel of the load carrying bar.

The cover is configured to have a direction of deformation along the width of the load carrying bar to provide space for the fastening member of the load carrying bar accessory. During mounting of a load carrying bar accessory, the fastening member can be slid into the channel and along the length of the channel of the load carrying bar. As the fastening member is moved, the cover will deform along the width of the load carrying bar, simultaneously as the fastening member is moved. The cover is thus adapted to be deformed in the proximity of the opening as the fastening member is slid along the length of the channel. The cover can be made in a material which substantially returns to its original form if the fastening member is removed or displaced from the current deformed section, If the fastening member is moved away from a section, that section will retain its original form, sealing the opening e.g. by abutting a side edge of the opening or an opposing portion of the cover, such as an opposing strip member as will be described below. This also permits the cover to leave space for the fastening member without having protruding parts or maintaining an unnecessary large area of the channel open. The cover does not need to be removed after being mounted, as the cover is adapted to structurally conform during mounting of the fastening member of a load carrying bar accessory.

It is of course possible that the cover is sold completely separately from the load carrying bar. At least some objects of the present invention could thus be met by the cover itself, without the load carrying bar.

The cover can be configured to have a main direction of deformation along the width of the load carrying bar to provide the space for the fastening member of the load carrying bar accessory. In an embodiment, the cover is configured to be deformed substantially only in along the width of the load carrying bar.

The channel of the load carrying bar comprises side walls and a floor and more precisely a front side wall and a back side wall. The floor of the side wall extends between the front and rear side wall. The main direction of deformation is directed towards at least one of the side walls, i.e. towards the front and/or the back side wall. Optionally the main direction of deformation is directed towards at least one of the side walls, i.e. towards the front and/or the back side wall, and not towards the floor of the channel. The cover may be attached to the front and/or the back side wall of the channel. Optionally the main direction of deformation is directed substantially perpendicular towards at least one of the side walls, i.e. towards the front and/or the back side wall. The cover when deformed may not have to about the floor of the cover, or if it abuts the floor of the channel, it only abuts lightly without imparting the floor of the channel with any significant pressure.

According to an aspect, the cover can be formed by a single strip member or be formed by a first and a second strip member. The strip member(s) extends parallel with the channel of the load carrying bar and can be inserted by a user when mounting the load carrying bar to an automobile or before being mounted to an automobile. When the cover comprises a first and the second strip member, the first and the second strip members are adapted to cooperate to seal the opening of the channel of the load carrying bar. As the strip members deform, they deform in opposite directions but still have a main direction of deformation along the width of the load carrying bar to permit space for the fastening member.

The cover can be attached to the load carrying bar in numerous ways. A channel of the load carrying bar has generally side walls and a floor. The channel can be defined by the frame work of the load carrying bar, or be formed by a separate insert in the load carrying bar. The side walls can be a front side wall or a back side wall with respect to the main direction of travel of the automobile.

According to an aspect, the attachment portion of the cover is attached in the proximity of the opening of the channel, to retain the cover to the load carrying bar. Optionally the attachment portion of the cover is attached in the opening of the channel, to retain the cover to the load carrying bar.

To attach the cover, the load carrying bar can be provided with at least one groove. The at least one groove can be arranged in the opening of the channel, e.g. one on either side of the opening of the channel. The attachment portion of the cover is arranged in the groove to retain the cover to the load carrying bar by e.g. being inserted by a user or optionally form-moulded directly into the grove.

The at least one strip member(s) of the cover can be provided with a hollow interior. In an embodiment, the channel sealing and/or the attachment portion can be hollow.

According to an aspect, a portion of the at least one strip member is configured to collapse into the hollow interior to enable the deformation along the width of the load carrying bar. The collapse to provide space for the fastening member of the load carrying bar accessory while still permit the strip member to retain its original shape after the fastening member has be displaced from the relevant section.

According to a second aspect, it is an object to provide a cover for a load carrying bar for a roof rack with a length, a height and a width. The cover is configured to be positioned in a channel of the load carrying bar, or is positioned in a channel of a load carrying bar to cover the opening of the channel. The cover comprises a channel sealing portion adapted to substantially seal the opening of the channel of the load carrying bar and a biasing portion adapted to bias or retain the channel sealing portion towards the opening of the channel of the load carrying bar.

The biasing portion of the cover is formed by at least two separate flanges extending from the channel sealing portion of the cover. The separate flanges are adapted to bias the channel sealing portion towards the opening by the resilience of the flanges. The resilience is a function of the form and the material of the flanges and should be adapted so that a user can insert a fastening member without difficulties but still seal the opening in an adequate manner on those portions not occupied by the fastening member.

The flanges can extend and are attached to the channel sealing portion substantially along the full length of the cover. The flanges are either formed together with the channel sealing portion as one unitary piece of material or attached as separate components thereto. It is also possible that the biasing portion comprises a plurality of flanges extending along the length of the cover which are aligned in a first and a second row, or in a plurality of rows.

It is optionally or additionally possible that the biasing portion comprises flanges with extend and are attached to the channel sealing portion substantially along the full width the cover. The flanges extending substantially along the width of the cover, and along the width of the load carrying bar after being mounted thereto, are substantially perpendicular to the flanges extending along the length of the cover, although they all have an extension along a height direction.

The biasing portion of the cover can be provided with at least 10 separate flanges e.g. arranged on an equally spaced distance from each other and positioned along the length of the cover 10.

At least some of the flanges of the biasing portion of the cover can be arranged with an angle of from 15-80 degrees with respect to the channel sealing portion.

The at least two separate flanges can be configured to extend outwards from the channel sealing portion and towards and into engagement with the side walls of the channel and/or towards the floor of the channel, for example, the at least two separate flanges can engages the floor of the channel to bias the channel sealing portion.

BRIEF DESCRIPTION OF THE DRAWINGS

Non limiting embodiments of the present invention will be described in greater detail with reference to the accompanying figures in which.

DETAILED DESCRIPTION OF PREFERRED EMBODIMENTS

Figure 1:
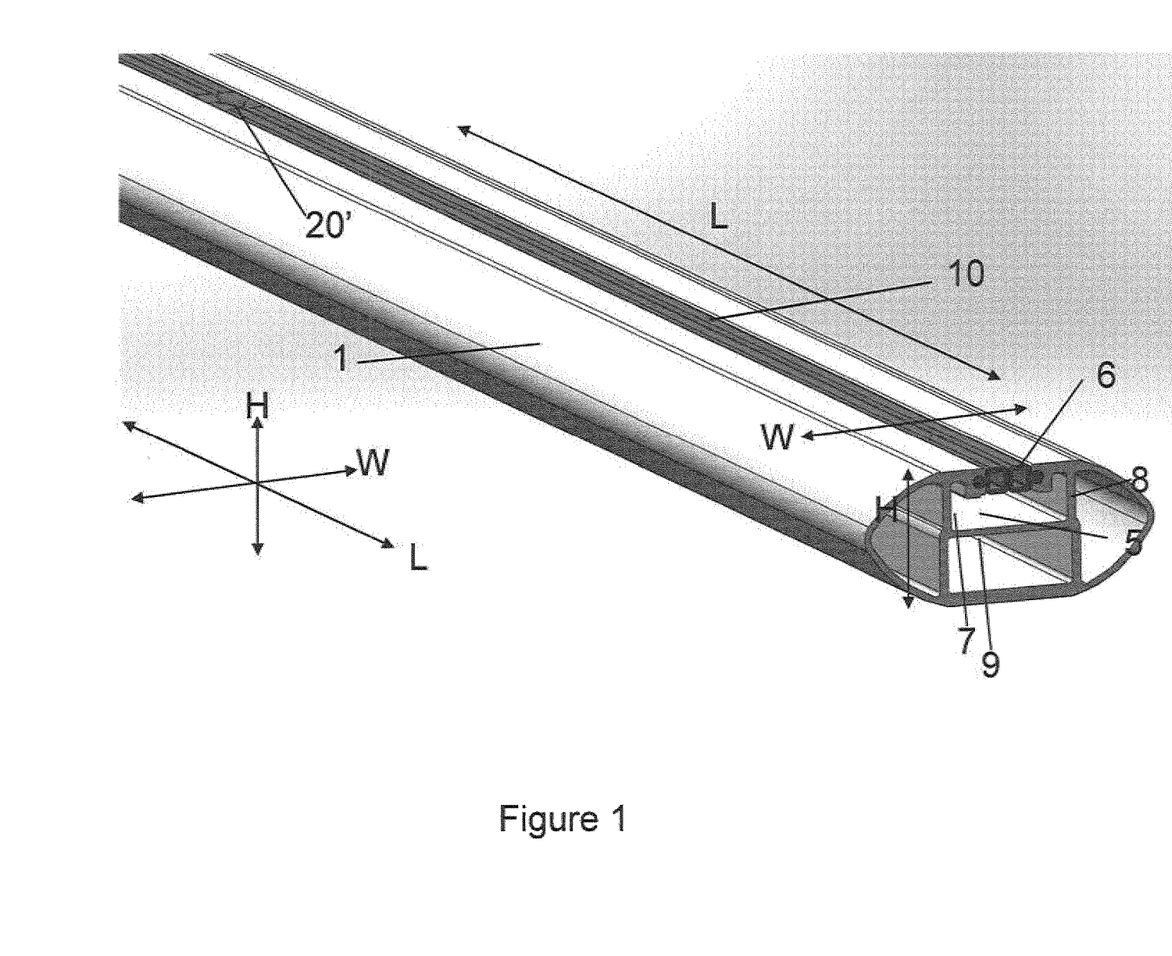
FIG. 1 shows a load carrying bar comprising a cover with a view in perspective.
Figure 3A:
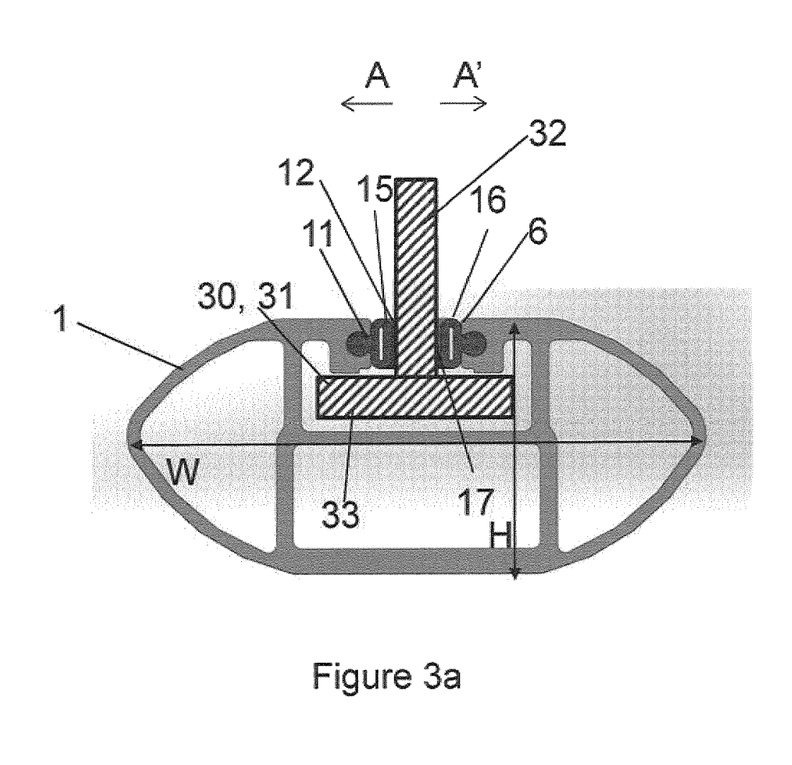
FIG. 3a shows the load carrying bar and the cover of FIG. 1 with a view towards the end of the load carrying bar and after a fastening member has been inserted in the channel of the load carrying bar.
Figure 3B:
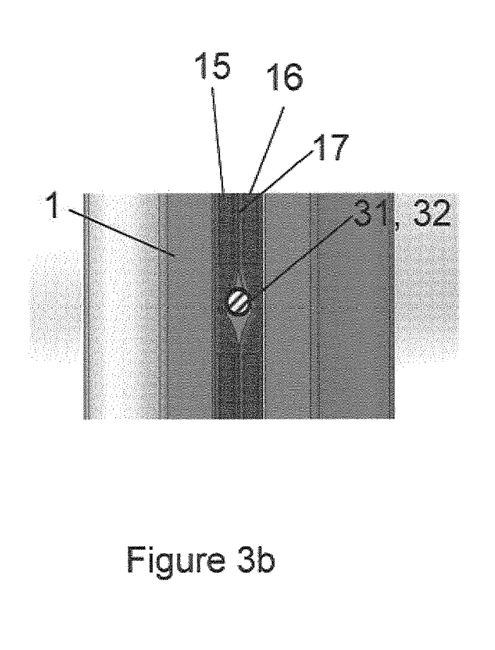
FIG. 3b shows the load carrying bar and the cover of FIG. 3a with a view from above.

FIG. 1 shows a load carrying bar 1 for a roof rack. A roof rack is intended during use to be mounted to e.g. the roof of an automobile such as a car or truck. A first and a second load carrier foot are generally positioned on each side of the automobile so that the load carrying bar 1 extends transversely across the roof of the automobile. The load carrying bar 1 is formed by extruded material such as aluminum and has a substantially oval cross section as can be seen in FIGS. 1 and 3a-3b for example with openings at each end (only one end shown in FIG. 1). The ends of the load carrying bar 1 can be sealed if desired by a separate lid, plug or by parts of the load carrier foot for example.

The load carrying bar 1 comprises a channel 5 for receiving a fastening member for a load carrying accessory. A load carrying accessory can be a roof box, a bicycle carrier, a luggage carrier, a ski carrier, or any other load carrier suitable to mount on a roof rack. The fastening member is generally the member which is used to attached the load carrier accessory to the load carrying bar 1 and can be a screw comprising a head for example as shown in FIG. 3a-3b.

For the purpose of orientation, the load carrying bar 1, and the cover 10 as described herein, has a length L usually extending along the width of the automobile, a height H usually extending along the height of the automobile, and a width W usually extending along the length of the automobile, when the load carrying bar 1 is mounted in the intended way to the automobile.

The load carrying bar 1 comprises a channel 5 in which the fastening member is intended to be introduced when mounting the load carrier accessory for example. The channel 5 extends along the full length of the load carrying bar 1 and is defined by an opening 6, a first and a second side wall 7, 8 and a floor 9. The first and the second side wall 7, 8 and the floor 9 of the channel 5 forms parts of a frame work structure of the load carrying bar 1 and significantly enhances the rigidity of the load carrying bar 1. A cover 10 is arranged to substantially seal the opening 6 of the channel 5 to reduce the air turbulence which otherwise can be formed about such channel in a load carrying bar. The cover 10 also prevents the intrusion of dirt or rubble to the channel which could obstruct the free passage of a fastening member for a load carrier accessory and thereby make the fastening member slide less easy in the channel 5.

Figure 2:
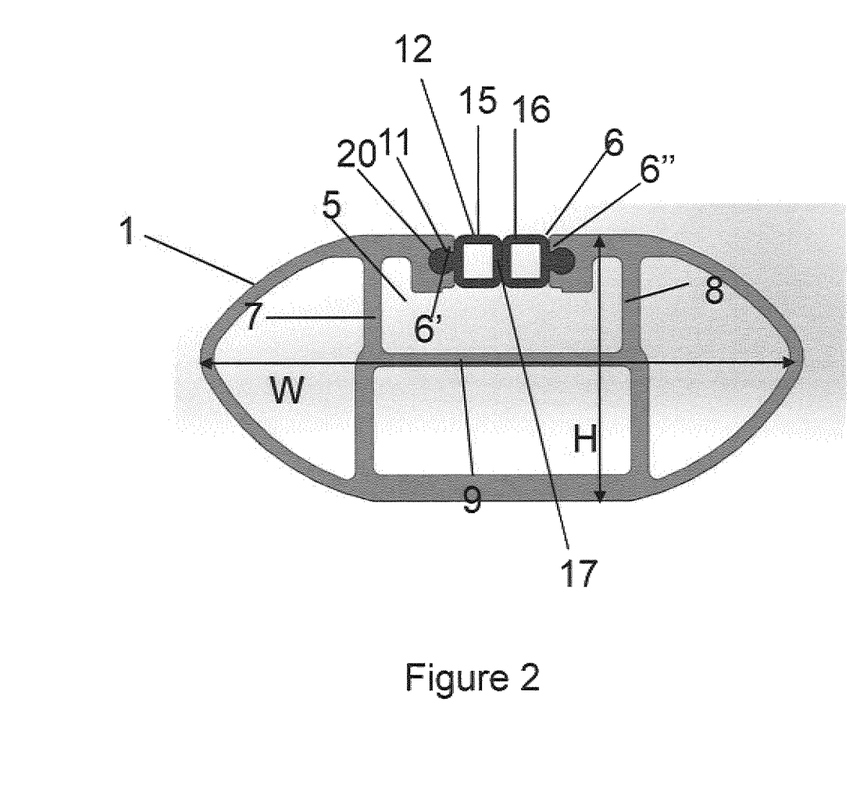
FIG. 2 shows the load carrying bar and the cover from FIG. 1 with a view towards the end of the load carrying bar.

FIG. 2 shows the load carrying bar 1 as seen along the length L in FIG. 1. FIG. 2 shows the load carrying bar 1, the channel 5, the opening 6, the first and the second side walls 7, 8 and the floor 9 of the channel 5. The width W and the height H of the load carrying bar 1 are also indicated. The cover 10 comprises an attachment portion 11 and a channel sealing portion 12. The primary purpose of the attachment portion is to retain the cover 10 to the load carrying bar 1 and the primary purpose of the channel sealing portion is to seal the opening 6 of the channel 5 of the load carrying bar 1. The cover 10 shown in FIG. 1 is formed by a first and a second strip member 15, 16, however, it should be noted that the cover 10 can be formed by only one strip member if desirable, If only one strip member is used, the form or dimension of the single strip member is adapted, e.g. by having a channel sealing portion 12.

The cover 10 in the shown embodiment comprises a first and the second strip member 15, 16. Each strip member comprising an attachment portion 11 and a channel sealing portion 12. The attachment portion 11 of the first strip member 15 and the second strip member respectively, is intended to retain the strip member 15 to the load carrying bar 1, while the channel sealing portion 12 are adapted to seal the opening 6 of the channel 5 in a cooperative manner. The channel sealing portion 12 of the first and the second strip member 15, 16 are adjacently positioned to cover or seal the opening 6 of the channel 5 of the load carrying bar 1. An openable slot 17 is thus formed between the first and the second strip members 15, 16.

In the shown embodiment, the attachment portion 11 of the first strip member 15 has a cross section which has a substantially spherical form adapted to be inserted into a groove 20 with a corresponding cross section. The attachment portion 11 can be formed in other ways dependent on the desired location and extension of the cover 10 and the strip member 15. The groove 20 is partly formed by a portion of the load carrying bar 1 defining the opening 6 of the channel 5 of the load carrying bar 1, but could be attached to the load carrying bar 1 in any other fashion. The portions of the load carrying bar 1 defining the opening 6 is indicated in FIG. 2 as 6', 6".

The channel sealing portion 12 of the first strip member 15 is formed by a portion of the first strip member 15 having a substantially quadric and hollow cross section. Other suitable cross sections could be oval, oblong, rectangular or the like. The channel sealing portion 12 could also be formed by a flap like member which cover or seal the opening 6 of the channel 5 by overlapping the opening 6 of the channel 5 or by overlapping a portion of a second strip member.

The channel sealing portion 12 of the first strip member 15 adapted to be deformed. By permitting deformation, the cover 10 can permit access to the channel 5 of the load carrying bar 1 for a fastening member to a load carrying bar accessory. In the shown embodiment, the channel sealing portion 12 is hollow, i.e. has a hollow interior, which permits the first strip member 15 to be deformed into the void of the hollow structure. Optionally, or additionally, the deformation could be implemented by having another collapsible structure or deformable material such as an open or closed cell-foam material, e.g. formed by polyurethane, polyurethane, polypropylene, polystyrene or the like, or mixtures thereof.

FIGS. 3a-3b show the load carrying bar 1 of FIGS. 1 and 2 having a fastening member 30 inserted into the channel 5 and the slot 17 formed between the first and the second strip member 15, 16. The fastening member 30 is formed by a screw 31 having a threaded stem 32 and a screw head 33. The screw head 33 is inserted at the end of the load carrying bar 1 and slid into position along the length L of the channel 5 of the load carrying bar 1. As is notable in FIG. 3b, the first and the second strip members 15, 16 effectively seal the portion of the opening 6 of the channel 5 which is not occupied by the fastening member 30. Substantially only the portion in the close proximity of the stem 32 of the screw 31 is not sealed.

The arrows A and A' indicate a main direction of deformation for the cover 10, which in the shown embodiment is along the width W of the load carrying bar 1. As the cover 10 comprises a first and a second strip member 15, 16, the cover 10 has in the shown embodiment two opposing deformation directions, however, both of the opposing deformation directions are along the width W of the load carrying bar 1 With specific reference to FIG. 3a, the first strip member 15 deform substantially from the center of the opening 6 of the channel 5 towards the left side of the opening 6 of the channel 5, while the second strip member 16 deforms substantially from the center of the opening 6 of the channel 5 towards the right side of the opening 6 of the channel 5. In an advantageous embodiment, the cover 10 is thus adapted to be deformed in two opposing directions along the width of the load carrying bar to accommodate space for a fastening member for a load carrying bar accessory, It should be noted that it is possible that the first and the second strip members 15, 16 also deform slightly in a vertical direction, i.e., along the height H, but that is not the main direction of deformation to provide space for the fastening member 30. Hence, a cover 10 having a main direction of deformation along the width of the load carrying bar is advantageous. As can be noted, not only is the main direction of deformation along the width of the load carrying bar 1, but also along the width of the channel 5. It has been found that it is advantageous to have a cover 10 arranged in the proximity of the opening 6 of the channel 5, which is adapted to deform along the width of the channel 5 and the width of the load carrying bar 1.

The cover 10 can be formed by any suitable deformable but self-restoring material such as a thermoplastic material, combinations of aluminum and thermoplastic material or similar. The channel sealing portion 12 can be formed by a material different from the attachment portion 11 or from the same material, preferably as one unitary piece of material.

Figure 4:
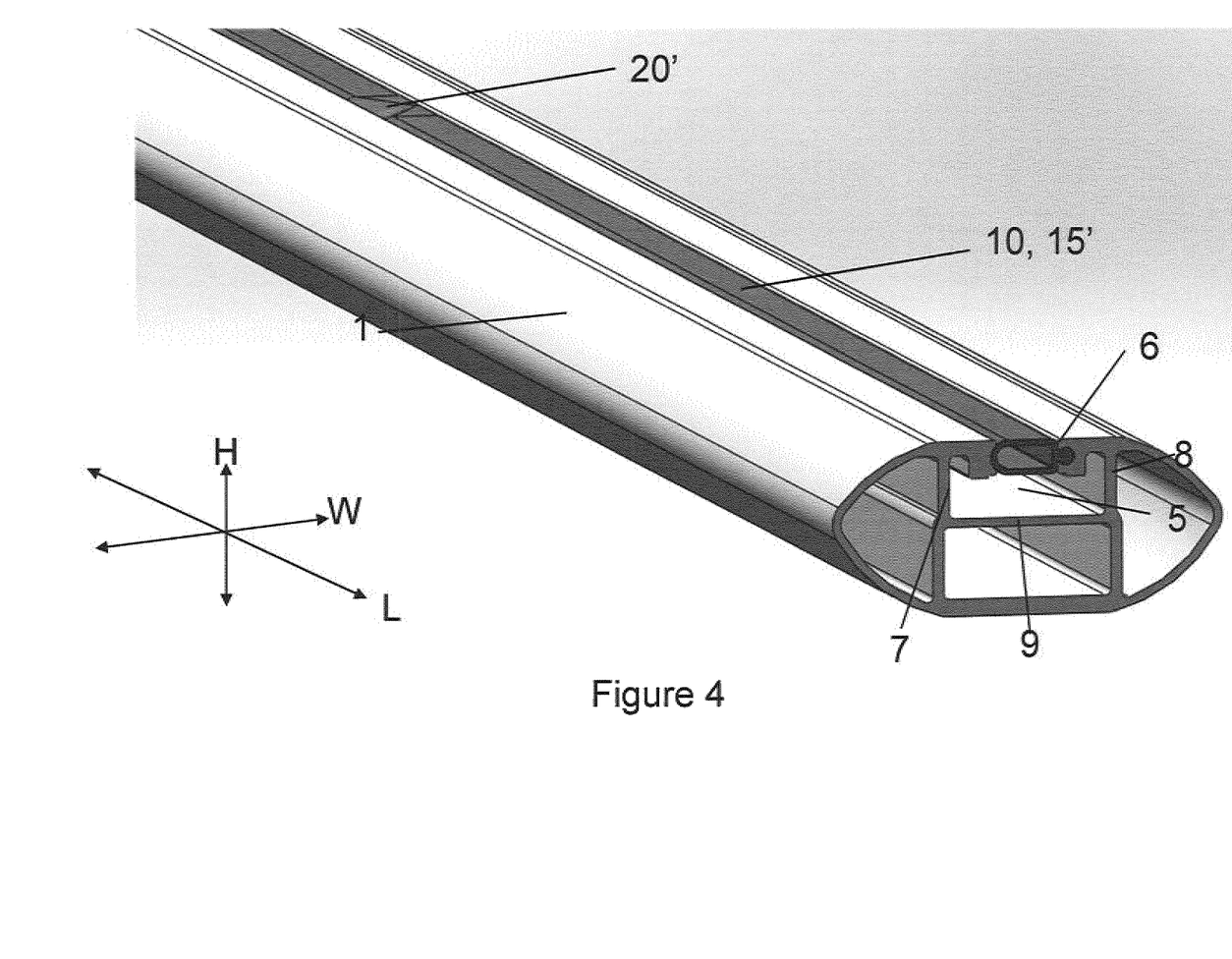
FIG. 4 shows a load carrying bar comprising a cover with a view in perspective.

FIG. 4 shows an embodiment of a cover 10 for a load carrying bar 1. As described above, the load carrying bar 1 comprises a channel 5 in which the fastening member for a load carrying bar accessory is intended to be introduced, e.g. when mounting the load carrier accessory. The channel 5 extends along the full length of the load carrying bar 1 and is defined by an opening 6, a first and a second wall 7, 8 and a floor 9. The first and the second wall 7, 8 and the floor 9 of the channel 5 forms parts of a frame work structure of the lead carrying bar 1 adapted to enhance the rigidity of the load carrying bar 1.

As can be noticed in FIG. 4, the cover 10 comprises only one strip member 15'. The cover 10 is in this embodiment adapted to be deformed mainly in the horizontal direction, i.e. along the width W of the load carrying bar 1 as indicated by the arrow A in FIG. 4.

Figure 5:
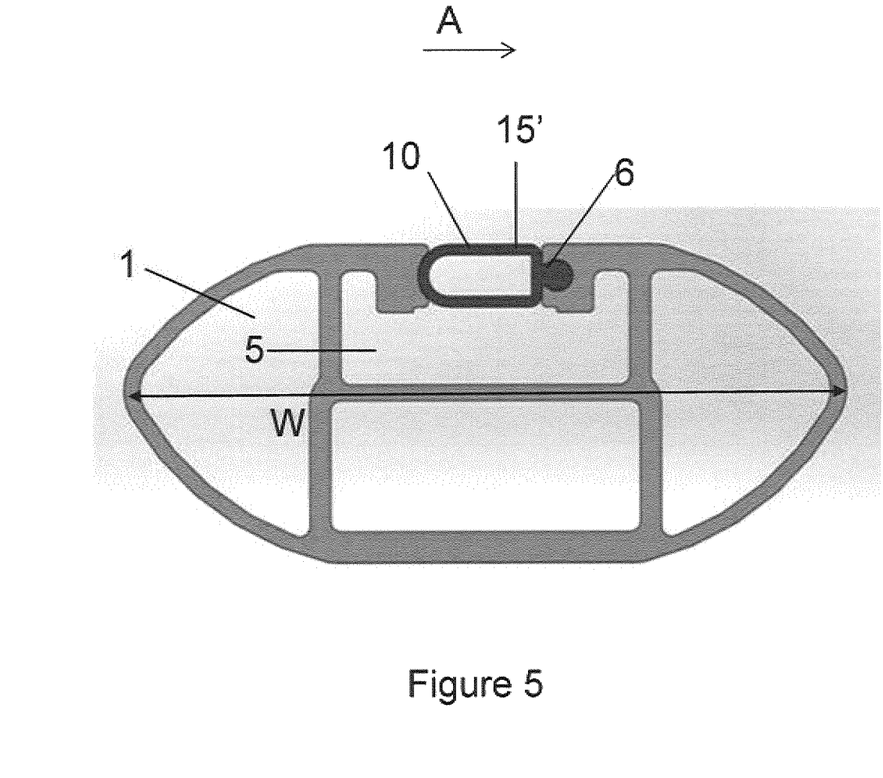
FIG. 5 shows the load carrying bar and the cover of FIG. 4 with a view towards the end of the load carrying bar.

Turning to FIG. 5, the arrow A indicate a main direction of deformation for the cover 10, which in the shown embodiment is along the width W of the load carrying bar 1. As the cover 10 in this embodiment only has one strip member 15', the cover 10 has in the shown embodiment one deformation direction. With reference to FIG. 5, the strip member 15' deforms substantially from the side of the opening 6 of the channel 5, towards the right side of the opening 6 of the channel 5. Before deformation, i.e. the state shown in FIG. 4, the strip member 15' is in direct contact with the left side of the opening 6 of the channel 5. In an advantageous embodiment, the cover 10 is thus adapted to be deformed in only one direction to accommodate space for a fastening member for a load carrying bar accessory. The strip member 15' is intended to return to its original form when the fastening member is removed from a specific region or from the channel 5 of the load carrying bar 1.

Figure 6:
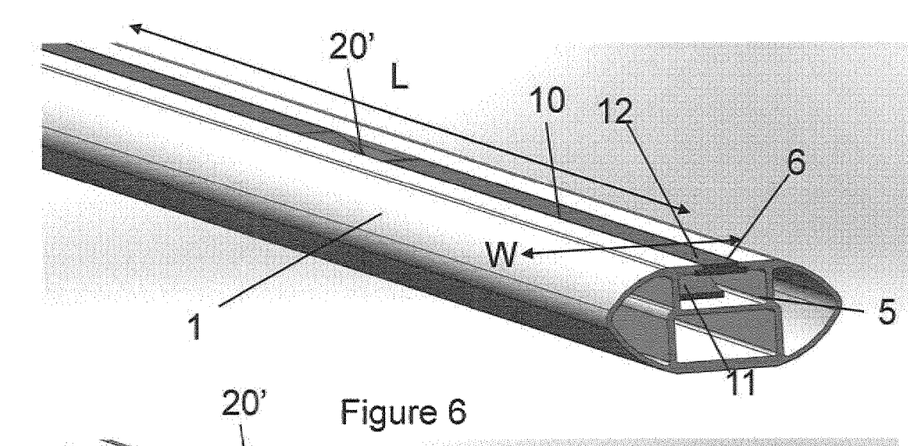
FIG. 6 shows a load carrying bar comprising another embodiment of a cover with a view in perspective.

FIG. 6 shows an embodiment of a cover 10 for a load carrying bar 1. The load carrying bar 1 is adapted to be connected with a first and a second load carrier foot (not shown). The cover 10 uses the principle of sealing the opening 6 of the channel 5 of the load carrying bar 1 by biasing a portion of the cover 10 towards the side edges of the opening 6 of the channel 5 of the load carrying bar 1. It thus seals the opening 6 from the inside of the channel 5 of the load carrying bar 1, The cover 10 in the shown embodiment comprises a biasing portion 11 and a channel sealing portion 12. The biasing portion 11 of the cover 10 is adapted to bias, or retain, the channel sealing portion 11 of the cover 10 against the opening 6 of the channel 5 of the load carrying bar 1, or more accurately against the side edges of the opening 6 so that the opening 6 of the channel 5 is effectively sealed.

The biasing portion 11 of the cover 10 is formed by at least two flanges, preferably separated from each other although being connected via the channel sealing portion 12. The shown embodiment comprises a plurality of flanges 11' preferably 10 or more, more preferably 20 or more flanges 11'.

Figure 7:
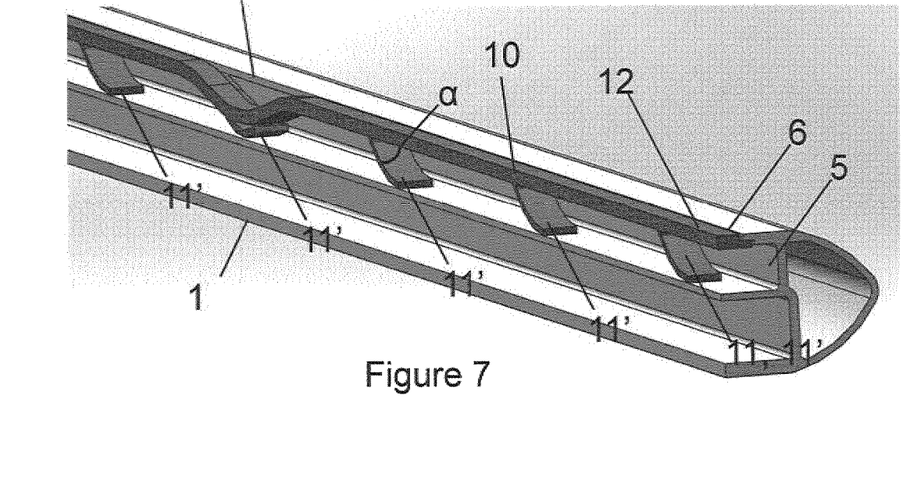
FIG. 7 shows a cross section of the load carrying bar of FIG. 6.

A cross section of the load carrying bar 1 and the cover 10 along the length L is shown FIG. 7. FIG. 5 shows flanges 11' arranged substantially perpendicular to the length L of the cover 10 thus having an extension along the width W of the load carrying bar 1 after being mounted thereto.

Figure 8:
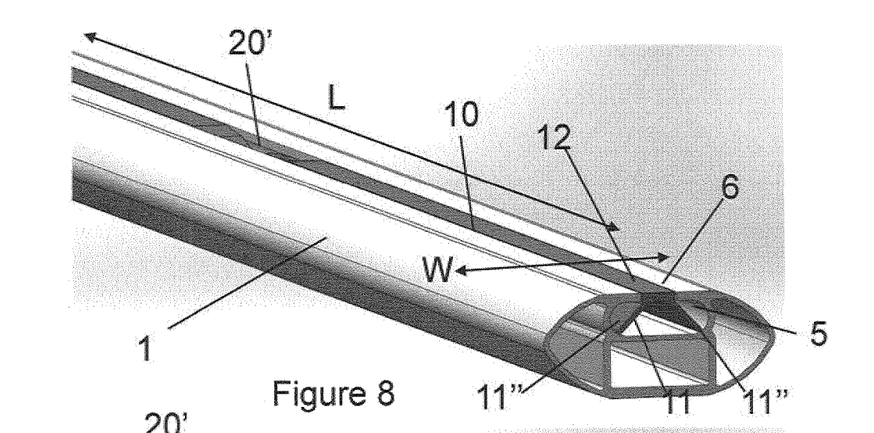
FIG. 8 shows a load carrying bar comprising another embodiment of a cover with a view in perspective.

FIG. 8 shows another embodiment of a cover 10 for a load carrying bar 1. The load carrying bar 1 is adapted to be connected with a first and a second load carrier foot (not shown). The cover 10 used the principle of sealing the opening 6 of the channel 5 of the load carrying bar 1 by biasing a portion of the cover 10 towards the side edges of the opening 6 of the channel 5 of the load carrying bar 1. It thus seals the opening 6 from the inside of the channel 5 of the load carrying bar 1. The cover 10 in the shown embodiment comprises a biasing portion 11 and a channel sealing portion 12. The biasing portion 11 of the cover 10 is adapted to bias, or retain, the channel sealing portion 11 of the cover 10 against the opening 6 of the channel 5 of the load carrying bar 1, or more accurately against the side edges of the opening 6 so that the opening 6 of the channel 5 is effectively sealed.

The biasing portion 11 of the cover 10 is formed by at least two flanges 11", preferably separated from each other although being connected via the channel sealing portion 12. The shown embodiment comprises a first and a second of flange 11". It is however possible that the biasing portion 11 comprises more flanges although in such case those flanges are preferably aligned along the length L of cover 10. The first and the second flanges 11" can be formed by a number of individual flanges, as indicated by the dashed lines in FIG. 7, which together substantially have the same form as the first and the second flanges 11" shown in FIGS. 6 and 7. The number of flanges can be 2 or more, 5 or more, optionally 10 or more flanges.

Figure 9:
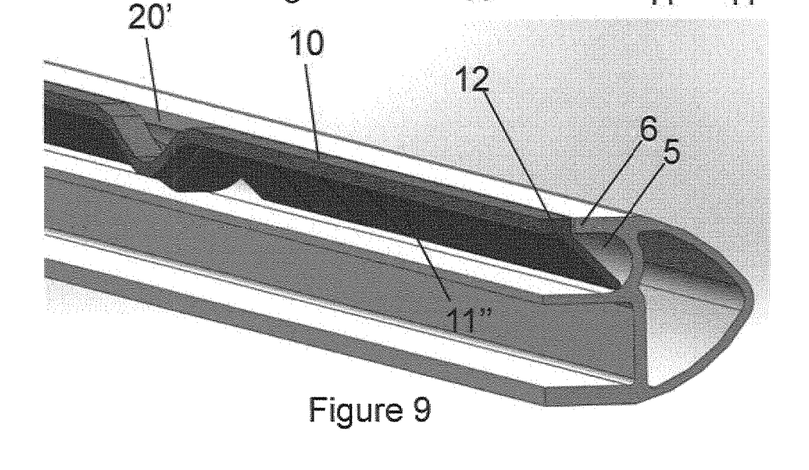
FIG. 9 shows a cross section of the load carrying bar of FIG. 8.

A cross section of the load carrying bar 1 and the cover 10 along the length L is shown FIG. 9. FIG. 5 shows flanges 11" arranged with an extension substantially parallel to the length L of the cover 10 thus having an extension along the length L of the load carrying bar 1 after being mounted thereto.

The reference 20' in FIGS. 1-9 is used to illustrate how a portion of the cover 10 has been deformed after a fastening member has been inserted in the channel 5 of the load carrying bar 1. The fastening member (not shown) can be similar or identical to the fastening member 30 described with reference to FIGS. 3a-3b.

Figure 10:
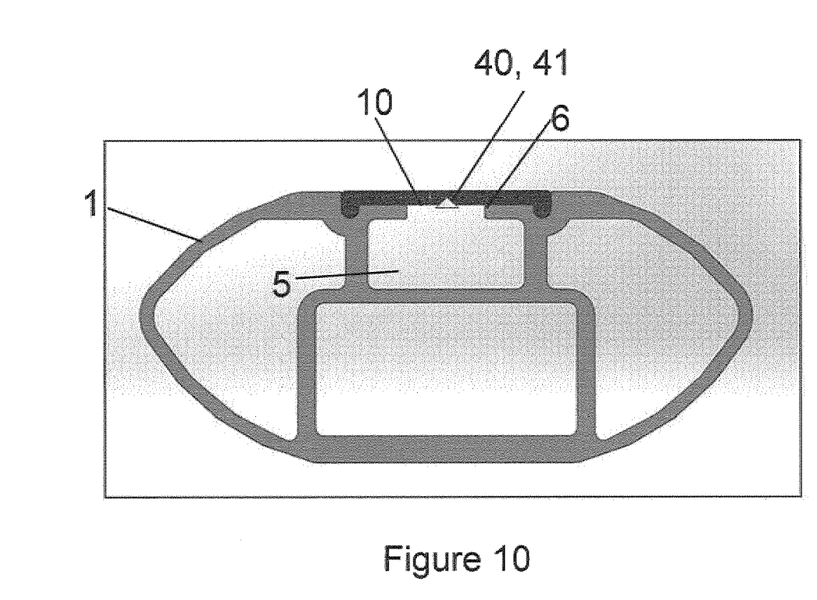
FIG. 10 shows a cross section of a load carrying bar comprising another embodiment of a cover having a weak section.
Figure 11:
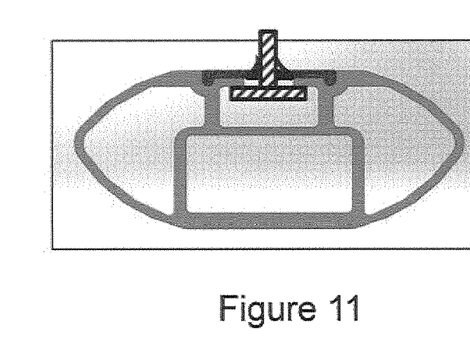
FIG. 11 shows a cross section of the load carrying bar and cover of FIG. 10 after a fastening member has been mounted.

FIG. 10 shows an embodiment in which the cover 10 comprises a weak section 40. The weak section 40 is in the shown embodiment formed by a cut out 41 in the cover 10. The cut out extends along the length L of the cover 10 and the load carrying bar 1 and is preferably arranged at the centre of the cover 10, as shown in FIG. 10. The cut out preferably extends along the full length L of the cover 10 The weak section permits a user to run a fastening member, such as a screw and the one shown in FIG. 3a and FIG. 11, along the length of the channel 5 so that a portion of the fastening member protrudes through the opening 6 of the channel 5. The fastening member will during such motion split the cover 10 at the weak section and deform the cover 10 in a horizontal and vertical direction, as is illustrated in FIG. 11. This is advantageous as a large portion of the channel 5 can remain fully covered by the cover 10 even after a load carrying bar accessory has been mounted.

Generally, cover 10 can be formed by any suitable deformable but self-restoring material such as a thermoplastic material, combinations of aluminum and thermoplastic material or similar. The channel sealing portion can be formed by a material different from the biasing portion 11 of the cover 10, or from the same material preferably as one unitary piece of material. In an embodiment, the channel sealing portion comprises a first thermoplastic material and the biasing portion comprises a second thermoplastic material different from the first thermoplastic material.

The invention claimed is:

1. A load carrying bar for a roof rack, said load carrying bar having a length, a height, and a width, wherein said length is greater than said width, said load carrying bar comprising:
   a channel along a portion of the length of the load carrying bar with an opening for receiving a fastening member of a load carrying bar accessory; and
   a cover configured to seal at least a portion of said opening of said channel of said load carrying bar, said cover comprising a channel sealing portion configured to seal said opening of said channel of said load carrying bar and a biasing portion adapted to bias or retain said channel sealing portion toward said opening of said channel of said load carrying bar,
   wherein said biasing portion of said cover is formed by at least two separate flanges extending from said channel sealing portion of said cover, and
   wherein said flanges have a length, a height, and a width, wherein said length is greater than said width, and the length of said flanges extends in a direction of the length of the load carrying bar.

2. The load carrying bar according to claim 1, wherein said at least two separate flanges extend and are attached to said channel sealing portion along the full length of said cover.

3. The load carrying bar according to claim 1, wherein said at least two separate flanges extend outward from said channel sealing portion and toward side walls of said channel.

4. The load carrying bar according to claim 1, wherein said at least two separate flanges extend and are attached to said channel sealing portion along the full width of said cover.

5. The load carrying bar according to claim 1, wherein said biasing portion comprises at least 10 separate flanges.

6. The load carrying bar according to claim 1, wherein said flanges are arranged with an angle to said channel sealing portion, said angle being from 15-80 degrees.

7. A load carrying bar for a roof rack, said load carrying bar having a length, a height and a width, said load carrying bar comprising:
   a channel with an opening for receiving a fastening member of a load carrying bar accessory; and
   a cover configured to seal at least a portion of said opening of said channel of said load carrying bar, said cover comprising an attachment portion for attaching said cover to said load carrying bar and a channel sealing portion configured to seal at least a portion of said opening of said channel of said load carrying bar,
   wherein said cover is configured to have a main direction of deformation along the width of said load carrying bar to provide space for said fastening member of said load carrying bar accessory.

8. The load carrying bar according to claim 7, wherein said channel has side walls and a floor, and wherein said main direction of deformation is directed toward at least one of said side walls.

9. The load carrying bar according to claim 7, wherein said cover comprises a first and a second strip member, said first and said second strip members extending parallel with said channel of said load carrying bar and being configured to cooperate to seal said opening of said channel of said load carrying bar.

10. The load carrying bar according to claim 9, wherein said first and said second strip members of said cover are configured to be deformed in opposite directions to provide space for said fastening member of said load carrying bar accessory.

11. The load carrying bar according to claim 7, wherein said channel of said load carrying bar comprises side walls and a floor, wherein said attachment portion of said cover is attached in the proximity of said opening of said channel to retain said cover to said load carrying bar.

12. The load carrying bar according to claim 11, wherein said attachment portion of said cover is attached in said opening of said channel to retain said cover to said load carrying bar.

13. The load carrying bar according to claim 12, wherein said load carrying bar comprises at least one groove, said at least one groove arranged in said opening of said channel, and wherein said attachment portion of said cover is arranged in said groove to retain said cover to said load carrying bar.

14. The load carrying bar according to claim 7, wherein said cover is formed by only one strip member, said strip member extending parallel with said channel of said load carrying bar and configured to seal said opening of said channel of said load carrying bar.

15. The load carrying bar according to claim 7, wherein said cover is formed by at least one strip member, wherein said at least one strip member has a hollow interior.

16. The load carrying bar according to claim 15, wherein a portion of said at least one strip member is configured to collapse into said hollow interior to enable said deformation along the width of said load carrying bar to provide space for said fastening member of said load carrying bar accessory.

17. The load carrying bar according to claim 16, wherein said cover comprises a weak section, said weak section being configured to rupture during mounting of a fastening member for a load carrying bar accessory.

18. The load carrying bar according to claim 17, wherein said weak section is formed by a cut out, said cut out extending along the length of said cover.

19. A load carrying bar for a roof rack, said load carrying bar having a length, a height and a width, said load carrying bar comprising:
   a channel with an opening for receiving a fastening member of a load carrying bar accessory; and
   a cover configured to seal at least a portion of said opening of said channel of said load carrying bar, said cover comprising an attachment portion for attaching said cover to said load carrying bar and a channel sealing portion configured to seal at least a portion of said opening of said channel of said load carrying bar,
   wherein said cover is configured to have a direction of deformation along the width of said load carrying bar to provide space for said fastening member of said load carrying bar accessory, and
   wherein said cover comprises a first and a second strip member, said first and said second strip members extending parallel with said channel of said load carrying bar and being configured to cooperate to seal said opening of said channel of said load carrying bar.

20. The load carrying bar according to claim 19, wherein said cover has a main direction of deformation along the width of said load carrying bar to provide space for said fastening member of said load carrying bar accessory.

21. The load carrying bar according to claim 19, wherein said first and said second strip members of said cover are configured to be deformed in opposite directions to provide space for said fastening member of said load carrying bar accessory.

22. The load carrying bar according to claim 19, wherein said channel of said load carrying bar comprises side walls and a floor, wherein said attachment portion of said cover is attached in the proximity of said opening of said channel to retain said cover to said load carrying bar.

23. The load carrying bar according to claim 22, wherein said attachment portion of said cover is attached in said opening of said channel to retain said cover to said load carrying bar.

24. The load carrying bar according to claim 23, wherein said load carrying bar comprises at least one groove, said at least one groove arranged in said opening of said channel, and wherein said attachment portion of said cover is arranged in said groove to retain said cover to said load carrying bar.

25. The load carrying bar according to claim 19, wherein said cover is formed by only one strip member, said strip member extending parallel with said channel of said load carrying bar and configured to seal said opening of said channel of said load carrying bar.

26. The load carrying bar according to claim 19, wherein said cover is formed by at least one strip member, wherein said at least one strip member has a hollow interior.

27. The load carrying bar according to claim 26, wherein a portion of said at least one strip member is configured to collapse into said hollow interior to enable said deformation along the width of said load carrying bar to provide space for said fastening member of said load carrying bar accessory.

28. The load carrying bar according to claim 27, wherein said cover comprises a weak section, said weak section being configured to rupture during mounting of a fastening member for a load carrying bar accessory.

29. The load carrying bar according to claim 28, wherein said weak section is formed by a cut out, said cut out extending along the length of said cover.

* * * * *